United States Patent

[11] 3,622,508

| [72] | Inventor | Thomas R. Komline<br>Gladstone, N.J. |
|---|---|---|
| [21] | Appl. No. | 65,185 |
| [22] | Filed | Aug. 19, 1970 |
| [45] | Patented | Nov. 23, 1971 |
| [73] | Assignee | Komline-Sanderson Engineering<br>Corporation<br>Peapack, N.J. |

[54] SLUDGE DISPOSAL
8 Claims, 1 Drawing Fig.

[52] U.S. Cl. ................................................. 210/9,
110/8, 210/10, 210/44, 210/67, 210/152
[51] Int. Cl. ................................................. C02c 3/00
[50] Field of Search ............................................ 210/9, 10,
12, 67, 71, 44, 152; 110/8

[56] References Cited
UNITED STATES PATENTS

| 3,399,637 | 9/1968 | Hirschfield | 110/8 |
|---|---|---|---|
| 3,322,079 | 5/1967 | Komline et al. | 110/8 |
| 3,319,586 | 5/1967 | Albertson et al. | 110/8 |
| 2,852,584 | 9/1958 | Komline | 210/46 |

OTHER REFERENCES

Braithwaite, R. L., Polymers as Aids to the Pressure Floatation of Waste Activated Sludge, Water & Sewage Works, Vol. 111, Dec. 1964, pp. 545–547 (Copy in GP. 176).

*Primary Examiner*—Michael Rogers
*Attorney*—Watson, Cole, Grindle & Watson

ABSTRACT: Sewage is subjected in sequence to primary and secondary treatment to derive separately therefrom a primary sludge formed of heavier solids and a secondary sludge formed of relatively lighter solids. The primary sludge is concentrated by filtering to form a comparatively dry filter cake, and the secondary sludge is delivered into a flotation tank, together with a pressurized solution of air and water, so that air bubbles released incident to the reduction of pressure attach to the agglomerated sludge particles and float them to the surface of the body of liquid within the tank. The floating blanket of sludge is removed from the tank and blended with the filter cake to form a substantially homogeneous liquid slurry which is then spray-dried and incinerated.

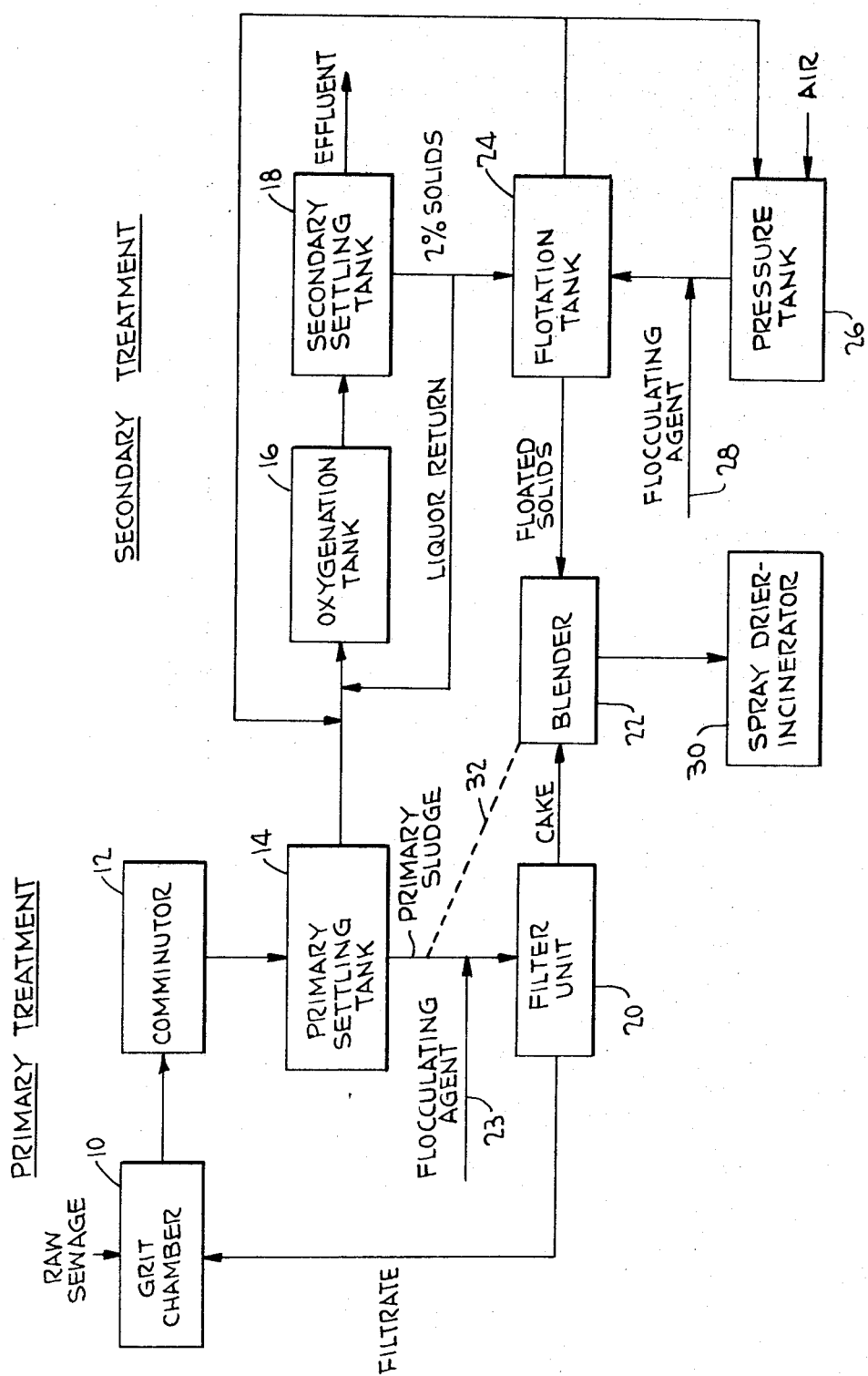

SLUDGE DISPOSAL

This invention relates to improvements in the concentration of sewage solids and more particularly to an improved method of sewage sludge disposal.

In the art of sewage treatment and disposal it is rapidly becoming customary and, in fact, required that the sewage be subjected at least to primary and secondary treatment and, in some cases, to higher degrees of treatment in order to avoid pollution of the receiving waters into which the effluent from such treatment is discharged.

Primary treatment or clarification generally includes such conventional steps as passing the raw sewage through a grit chamber and thence through a bar screen or comminuter and into a settling tank. In secondary treatment, the sewage from the primary settling tank (minus the settled solids) is subjected to oxygenation or aeration and then is delivered into a secondary tank, the effluent from which may either be discharged into the receiving waters or subjected to still further treatment or clarifying steps.

Customarily the sludge which settles in the bottoms of the primary and secondary settling tanks, is placed in a digester where it is held under anaerobic conditions for approximately 30 days to convert part of the sludge solids into gas by bacterial action and by the same action to break down the solid matter to a relatively odorless inert material which can be disposed of by known methods.

However, the digestion step in sewage sludge treatment and handling requires large and costly equipment while involving a considerable delay in the disposal of the sludge. Also the digestion process as above outlined, results in the formation of a large amount of colloids which do not settle, and substantially increases the alkalinity and nutrient values in the sewage effluent. These values have been found to detract seriously from the quality of the receiving waters. Nutrients, especially, tend to proliferate the growth of algae in the receiving waters.

My U.S. Pat. No. 2,852,584 of Sept. 16th 1958 discloses a process which provides for both primary and secondary treatment of raw sewage sludge, while eliminating the digestion thereof. In this process the solids from the settling tanks of both the primary and secondary treatments are dewatered by means of a common coarse filter media so that they may be suitably disposed of as for instance by heat drying and incineration. While the process disclosed in this patent has come into widespread use, both in the United States and abroad, it has been found in actual practice that the lighter and smaller solid particles produced by secondary treatment, have substantially higher water content than the primary solids, and give up their water most grudgingly, thereby detracting substantially from the overall rate of filtration and thus from the capacity of the process.

These secondary solids have also been found to have different chemical or polyelectrolyte requirements for their agglomeration than the primary solids, especially with regard to the use of lime, and it would therefore be beneficial to handle these sludges separately, using the type of flocculating or agglomerating agent most effective for the agglomeration of the solids in each type of sludge.

In view of the well-known population explosion throughout the world, and the resulting great increase in sewage and sewage sludge disposal requirements, it is of utmost importance that there be made available a method of sewage solids disposal which eliminates not only the requirement for any digestion of the sewage solids but which, also, is capable of helping effect both primary and secondary treatment to a substantially higher degree than has been obtainable by known processes or methods. The present invention envisions such an improved process which may be carried out with a minimum of apparatus, and which therefore makes possible substantial effectiveness and economy in the required apparatus.

SUMMARY OF THE INVENTION

In accordance with the present invention, the sewage is subjected to sequential treatments, including at least conventional primary and secondary treatments, to derive therefrom by the primary treatment a primary sludge consisting of heavier solids and to derive by the secondary treatment a secondary sludge consisting of relatively lighter solids. The primary sludge with its heavier solids is concentrated by dewatering on a filter unit to form a solid filter cake of relatively low moisture content, while the secondary sludge is concentrated by flotation, the concentrated sludges then being blended into a liquid slurry which is discharged as a fine spray for drying and incineration. In the preferred form of the process, the concentrated secondary sludge, with its relatively high moisture content, is employed as a vehicle for the relatively drier filter cake, the proportions of filter cake and secondary sludge being chosen to produce a liquid slurry of a consistency for formation of a finely divided spray, without the addition of liquid, such as would detract from the speed of the drying and incineration.

Further, in accordance with the invention, the primary sludge is subjected to treatment by a suitable flocculating agent, while the secondary sludge, following removal of the primary sludge, is separately subjected to treatment by a different flocculating agent adapted for efficient action on the secondary sludge.

In a modification of the process, the filtering of the primary sludge is eliminated and such sludge with its comparatively heavy concentration of solids is directly blended with the sludge derived by secondary and any subsequent treatments, to form a slurry which is then subjected to spray drying and incineration as in the preferred mode of practicing the process.

The improved process of the present invention is illustrated by way of exemplification in the accompanying drawing, in which the FIGURE is a diagrammatic flow chart tracing the passage of material from the inflowing raw sewage to discharge of effluent and the derivation and incineration of the solids, an alternative flow path for the primary sludge being designated by a broken line.

Referring now in detail to the accompanying drawing: In accordance with the preferred process of this invention, the raw sewage is first subjected to a primary treatment or clarification of a conventional nature in which it passes sequentially through a grip chamber 10, a comminuter 12 and thence into a primary settling tank 14. It will be understood that certain of the heavier solids contained within the raw sewage will have been eliminated at the grit chamber 10 in accordance with usual practice, while the remaining solids are finely shredded by passage through the comminuter 12 and are carried along into the settling tank 14, where the larger and heavier sludge particles settle to the bottom of the tank in the form of a sludge, hereinafter referred to for purposes of convenience as a primary sludge.

The primary tank effluent minus the primary sludge then is subjected to secondary treatment or clarification in which it is passed through a conventional oxygenation tank 16 in which oxygen is blown through the sewage. The sewage is then passed into a secondary settling tank 18 in which the finer, lighter particles of sludge settle to the bottom, such sludge being hereinafter referred to as secondary sludge. The effluent from the secondary settling tank 18 then is discharged into receiving waters or if desired, may be subjected to still further treatment or clarification.

The settled primary sludge, which normally includes about 5 percent of solids, is subjected to a dewatering process as by subjecting it to the action of a conventional rotary drum-type vacuum filter 20 to concentrate the primary sludge into a substantially solid filter cake of approximately 65 percent moisture content, which filter cake is progressively discharged into a blender 22. Before its delivery to the filter unit 20, there may be added to the primary sludge a suitable chemical flocculating agent, as indicated at 23 in the drawing, and as proposed in my prior U.S. Pat. No. 2,852,584. The filter unit 20 may be constructed as disclosed in my U.S. Pat. No. 3,090,488. Preferably, the filtrate from the filter unit 20 is returned back to the grit chamber 10 for recycling with the inflowing raw sewage.

Secondary sludge from the settling tank 18, as is well known, will consist of lighter and finer flocculent solid particles having a substantially higher water content than the primary sludge and having an appreciably higher water retention capability than the primary sludge. Because of this, the secondary sludge, if concentrated by filtering on the unit 20, will greatly reduce the rate of filtration and capacity of that unit and of the entire process.

However, it has been found that such secondary sludge may be rapidly and efficiently concentrated by a conventional flotation process such as is disclosed, for instance in the Jones U.S. Pat. No. 3,175,687. Thus, the secondary sludge from the secondary settling tank 18 is delivered into a flotation tank 24 at a location near the bottom thereof and thus substantially beneath the surface of the body of liquid within the tank. A pressurized solution of air in water is continuously delivered from a pressure tank 26 into the flotation tank together with the secondary sludge. A flocculating agent preferably is delivered into the air-water solution at 28, as indicated, to assist in agglomerating the solid particles of secondary sludge within the flotation tank. As the air-water solution is released from pressure incident to its introduction into the flotation tank 24, the air is caused to come out of the solution and form fine bubbles which attach themselves to the particles of secondary sludge to float the agglomerated particles to the surface of the body of water within the tank to form a floating blanket of sludge which is removed by usual skimming means. These floated solids are then transferred to the blender 22 which may be of a conventional type functioning to break up the filter cake from the filter unit 20 so that this cake may be intermixed and blended with the floated secondary sludge to form a generally homogeneous suspension or slurry of the mixed sludges, floated secondary sludge with its relatively high moisture content thus is employed as a vehicle for the relatively dry filter cake. The filter cake and the secondary sludge are delivered into the blender in such proportions as to produce a liquid slurry of a consistency for efficient spray drying and incineration as hereinafter described, without the addition of further liquid or the consequent necessity for removing the same in further processing.

From the blender 22 the slurry is transferred to a spray dryer furnace or sludge incinerator 30 which may be of the type disclosed in my prior U.S. Pat. No. 3,322,079 of May 30th 1967. In such a furnace, the liquid slurry is discharged as a fine spray through a centrifugal atomizer into a current of hot gases in a spray-drying chamber, the spray-drying chamber preferably being located above an ignited bed of solid fuel onto which the heavier particles of sludge may fall to complete their oxidation.

The sizes and capacities of the filtering unit 20 and the flotation unit 28 will be so related as to supply filter cake and floated solids to the blender 22 in such proportions as to provide a liquid slurry of the proper consistency.

With the various components of apparatus for carrying out the process so selected and interrelated, it will be apparent that the primary and secondary solids are separately concentrated by filtering and by flotation, respectively, which modes of concentration are especially adapted to and afford substantially maximum efficiency and capacity for the respective concentrating steps. Since such steps are carried out separately, neither will interfere with or detract from the other. Moreover, moisture contents of concentrated sludges from the respective treatments are so related as to supplement each other when delivered in proper porportions into the blender 22 to form a blended, substantially homogeneous liquid slurry adapted for treatment in a sludge incinerator such as disclosed in the Komline et al. U.S. Pat. No. 3,322,079. It is thus possible to obtain a quite high capacity of both primary and secondary treatment of the raw sewage solids with substantial economies in the apparatus required. By elimination of the conventional digesting steps or stages, there are eliminated the potential deteriorating effects upon the receiving waters now commonly associated with digestion.

In a modified embodiment of the process, the various steps and apparatus may be substantially as shown in FIG. 1 and as heretofore described, except that the filter unit 20 is completely eliminated and the primary sludge from the settling tank 14, instead of passing through such unit 20, is carried directly to the blender 22, as shown by the broken line 32. The primary sludge thus carried from the settling tank 14 directly into the blender 22, will thus have a high moisture content generally of about the same order as that of the flotation solids conveyed into the blender from the flotation tank 28. The present modified process has the advantage of being somewhat simpler and of eliminating the normally quite expensive filter unit 20 of the preferred process, though such advantages are offset by the resulting presence in the blended sludges of an excessive amount of water which must be removed by the spray-dryer furnace or incinerator.

In this application I have shown and described only the preferred embodiment of my invention, together with a single modification thereof. However, I recognize that the process of my invention is capable of further modification and may be carried out with other apparatus than that specifically disclosed. Accordingly, the drawings and description herein are to be regarded as merely exemplary in nature and not as restrictive.

Having thus described my invention I claim:

1. The method of sludge disposal wherein sewage is subjected in sequence to both primary and secondary treatment to drive separately therefrom a primary sludge consisting of heavier solids and a secondary sludge consisting of relatively lighter solids; including the steps of concentrating the lighter solids of said secondary sludge by flotation thereof to achieve a moisture content therein of the order of 92 percent by weight; dewatering the primary sludge by filtering to form said primary sludge into a solid filter cake having a moisture content of the order of 65 percent by weight; thereafter blending said dewatered primary sludge and said concentrated secondary sludge to form a liquid slurry in which said concentrated secondary sludge is employed as a vehicle for said dewatered primary sludge; and discharging said slurry as a fine spray into a current of hot gases to finely divide and dry said blended sludges.

2. The method of sludge disposal defined in claim 1, in which said secondary sludge has a sufficiently high moisture content, and is provided in sufficient proportion, to form a liquid slurry without the addition of further moisture when blended with said solid filter cake.

3. The method of sludge disposal wherein sewage is subjected in succession to primary and secondary treatment to settle the heavier and lighter solids therefrom in the form of sludge in separate primary and secondary settling tank, respectively; transferring the settled sludge from said secondary settling tank to a flotation tank; dissolving air at superatmospheric pressure in a body of water within a pressure tank; releasing said air-water solution from the pressure tank into said flotation tank, whereby air bubbles released from the water will attach to the sludge particles and float them to the surface of said body of water; removing said sludge particles from the surface of said body of water; dewatering the sludge from said primary settling tank to form a substantially solid filter cake of relatively low moisture content; then blending said floated sludge particles with the sludge removed from said primary settling tank and dewatered to form a liquid slurry; and spray drying and incinerating said slurry.

4. The method of sludge disposal defined in claim 3, in which said filter cake is dewatered to a moisture content in the order of 65 percent by weight and said floated sludge particles have a moisture content of the order of 92 percent by weight, the excess moisture of the floated particles serving to liquefy the blended sludges.

5. The method of sludge disposal defined in claim 3, including the steps of introducing a first flocculating agent into said primary sludge before dewatering it; and of introducing a second flocculating agent into said secondary sludge.

6. The method of sludge disposal which comprises the steps of:
   a. Subjecting sewage to a primary clarification which includes the separation of the heavier solids by settling as sludge in a primary settling tank;
   b. Then subjecting said sewage to a secondary clarification which includes separation of the lighter solids therefrom by settling as sludge in a secondary settling tank;
   c. Removing and filtering the settled sludge from said primary settling tank to form a solid filter cake, wherein the improvement comprises:
   d. Transferring the settled sludge from said secondary settling tank into a flotation tank
   e. Releasing small air bubbles in the bottom portion of said flotation tank to attach to the sludge particles and float them to the surface of the liquid within the flotation tank;
   f. Removing the floating sludge particles from the surface of the liquid;
   g. Comminuting and blending said solid filter cake with the last mentioned sludge particles to form a liquid slurry; and:
   h. Centrifugally atomizing said slurry in a current of hot gases to convert said sludge into substantially dry comminuted solids.

7. The method of sludge disposal defined in claim 5, including the step of incinerating said comminuted solids.

8. The method of sludge disposal defined in claim 6, including the step of introducing a flocculating agent into said flotation tank.

* * * * *